(12) United States Patent
Calverley et al.

(10) Patent No.: US 8,968,042 B2
(45) Date of Patent: Mar. 3, 2015

(54) ELECTRIC MARINE PROPULSION DEVICE WITH INTEGRAL MAGNETIC GEARING

(75) Inventors: Stuart Calverley, Sheffield (GB); David Powell, Sheffield (GB)

(73) Assignee: Magnomatics Limited (GB)

( * ) Notice: Subject to any disclaimer, the term of this patent is extended or adjusted under 35 U.S.C. 154(b) by 305 days.

(21) Appl. No.: 13/260,428

(22) PCT Filed: Mar. 26, 2010

(86) PCT No.: PCT/GB2010/050518
§ 371 (c)(1),
(2), (4) Date: Dec. 21, 2011

(87) PCT Pub. No.: WO2010/109248
PCT Pub. Date: Sep. 30, 2010

(65) Prior Publication Data
US 2012/0094555 A1    Apr. 19, 2012

(30) Foreign Application Priority Data
Mar. 26, 2009 (GB) .................................. 0905146.7

(51) Int. Cl.
*B63H 23/24* (2006.01)
*H02K 51/00* (2006.01)
*B63H 5/125* (2006.01)

(52) U.S. Cl.
CPC ............... *B63H 23/24* (2013.01); *H02K 51/00* (2013.01); *B63H 2005/1258* (2013.01)
USPC ................................... 440/6; 310/46; 310/114

(58) Field of Classification Search
USPC ........... 440/6, 3; 310/46, 49.37, 49.44, 49.46, 310/114
See application file for complete search history.

(56) References Cited

U.S. PATENT DOCUMENTS 3,914,629 A * 10/1975 Gardiner ......................... 310/46
3,984,711 A * 10/1976 Kordik ....................... 310/49.46

(Continued)

FOREIGN PATENT DOCUMENTS

| | | |
|---|---|---|
| EP | 0489518 | 6/1992 |
| GB | 1401461 | 7/1975 |

(Continued)

OTHER PUBLICATIONS

K. Atallah, S.D. Calverley, D. Howe; "Design, analysis and realization of a high performance magnetic gear"; IEE Proceedings-Electric Power Applications, vol. 151, pp. 1235-1243, 2004.

(Continued)

*Primary Examiner* — Lars A Olson
(74) *Attorney, Agent, or Firm* — Baker & Hostetler LLP

(57) ABSTRACT

A propulsion device for a marine vessel, the propulsion device comprising an electrical machine with integral magnetic gearing, which comprises three members, namely a first or inner rotor comprising a first plurality of permanent magnets, a second rotor in the form of a plurality of ferromagnetic pole pieces, and a stator which is associated with a plurality of 3-phase windings and to the periphery of which a plurality of second permanent magnets are fixed. The magnetic pole piece rotor is connected to a drive shaft provided with a propulsion means for providing propulsion to the marine vessel. The first or inner rotor is free to rotate about the drive shaft. The pole pieces of the second rotor are arranged to magnetically couple the permanent magnets of the first or inner rotor to the second permanent magnets on the stator.

13 Claims, 8 Drawing Sheets

(56) References Cited

U.S. PATENT DOCUMENTS

| | | | |
|---|---|---|---|
| 5,306,183 A * | 4/1994 | Holt et al. | 440/6 |
| 5,616,056 A * | 4/1997 | Meissner | 440/3 |
| 5,717,316 A * | 2/1998 | Kawai | 310/49.44 |
| 6,794,781 B2 * | 9/2004 | Razzell et al. | 310/114 |
| 7,198,528 B2 * | 4/2007 | Varis | 440/6 |
| 7,982,351 B2 | 7/2011 | Atallah et al. | |
| 2005/0077800 A1 | 4/2005 | Hoeijmakers | |
| 2007/0093589 A1 | 4/2007 | Proctor et al. | |
| 2008/0207066 A1 | 8/2008 | Chung et al. | |

FOREIGN PATENT DOCUMENTS

| | | |
|---|---|---|
| GB | 2437568 | 10/2007 |
| GB | 190926346 | 9/2010 |
| JP | 63-242264 | 10/1988 |
| JP | 2001-172511 | 6/2001 |
| JP | 2004-285291 | 10/2004 |

OTHER PUBLICATIONS

Atallah et al., "A Novel High-Performance Magnetic Gear", IEEE Transactions on Magnetics, Jul. 2001, 37(4), 2844-2846.

Atallah et al., "Design, Analysis and Realisation of a High Performance Magnetic Gear", IEEE Proceedings-Electric Power Applications, 2004, 151, 135-143.

International Patent Application No. PCT/GB2009/050518: International Search Report, dated Jul. 21, 2009, 4 pages.

* cited by examiner

ELECTRIC MARINE PROPULSION DEVICE WITH INTEGRAL MAGNETIC GEARING

CROSS REFERENCE TO RELATED APPLICATIONS

This application claims the benefit of International Application No. PCT/GB2010/050518 filed Mar. 26, 2010, having a claim of priority to GB patent application number 09 05146.7, filed Mar. 26, 2009.

The present invention relates, in general, to propulsion systems and more particularly to a marine propulsion device and method of operating the same.

Electric propulsion, in which the propellers are driven by electrical machines, has become the established technology for most types of commercial vessels such as cruise ships, ferries, icebreakers, floating production and drilling platforms, shuttle tankers, cable and pipe layers and the like.

Electric propulsion has replaced more conventional propulsion in which the propeller shaft would be mechanically connected to the source of propulsive power (prime-mover) either directly, or through a mechanical gearbox/transmission. For example, a low-speed diesel engine would be directly connected to the shaft (rotating at 50-300 rpm) or a high speed steam or gas turbine (operating at 3000 rpm) would be interfaced with the low speed propeller through a gearbox.

For mechanically driven propellers, the siting of the engine remote from the propeller (engine tending to be mid-ship and propeller at the stern to ensure correct balance of the vessel and to achieve a suitable rake angle on the propeller shaft for hydrodynamic reasons) necessitated massive drive shafts running through stern tubes limiting the ship arrangement and using valuable space for revenue generating payload.

At low-loads, for example when manoeuvring, the prime-mover would be operating at a low efficiency and would increase emissions. For vessels that spend a higher proportion of their time station-holding or manoeuvring, the inefficiencies can significantly increase fuel consumption and hence running costs and reduce the operational range of the vessel between refuelling.

Further, due to the difficulty in operating gas turbines or diesels in reverse, controllable pitch propellers are necessary which require complicated mechanical/hydraulic arrangements to alter the pitch of the propeller blades.

Electric propulsion overcomes many of the problems discussed above by mechanically decoupling the propulsion systems from the power source, and the propeller is driven by an electrical machine which is supplied by an electrical generator driven by prime-movers. Both asynchronous (induction) and synchronous machines (usually permanent magnet excited) are employed as propulsion motors. A power electronic inverter can be employed to control the speed/torque delivered by the machine. It is preferred that the electrical machine is directly connected to the propeller shaft which operates at a low speed, and hence a very high torque for a given power rating.

The torque capability of an electrical machine is determined by the airgap flux density, winding currents (both of which determine the airgap shear stress capability) and the active area of the airgap. In conventional machines the airgap flux density is limited by the material limits on saturation flux density in electrical steels and remanence of permanent magnet materials etc. High torque density (or high airgap shear stresses which allows a compact machine to be used for a given torque) can then be achieved by increasing the electric loading or currents. However, higher current loadings require significant cooling to remove the heat generated due to Joule heating losses incurred in the windings. The torque density of conventional machines can be increased by cooling methods (forced air cooling through lamination stacks, water cooling jackets, helium cooling systems etc) all of which add to system complexity. However, fundamental limits are still reached within these machines which limits the airgap shear stress capability and means that the machines will still be physically large. In industrial drives etc, the conventional approach to this problem is to operate the electrical machine at a higher speed (reducing the required torque for a given power level) and then employing a gearbox to produce a low speed, high torque output. However, the use of a gearbox introduces a number of disadvantages. Mechanical gearboxes have contacting, wearing parts and require significant quantities lubrication oil, filtering and cooling circuits, high levels of maintenance and are prone to jamming and failure. They also produce significant noise and vibration.

The challenge for electric propulsion is to effectively generate a very high torque to a propeller at low speed, allowing direct drive (without gearbox) of the propeller without incurring a significant mass/volume penalty. In the art, there are two main approaches to improve the torque density and there is an industry pull towards research and development in transverse flux machines and superconducting machines.

A Transverse Flux Machine (TFM) requires a complex 3-D structure compared to conventional radial and axial field machines, which is difficult to make mechanically rigid. The magnetic pull on the laminated stator components due to the rotor permanent magnets can lead to fatigue problems and difficulties in holding mechanical air-gaps. More importantly the TFM exhibits a very low power factor (with Figures of 0.35 to 0.45 being typical). For example, a 1 MW input at a power factor of 0.4 requires a power electronics inverter capable of 2.5 MVA, leading to a significant increase in the cost of size of switching devices and rating of all the protection and higher switching and conduction losses and hence a reduction in system efficiency. The size of the inverter is also disproportionally large and although the machine maybe more compact (due to the higher torque density), the combined system will not be smaller than a more conventional PM machine/induction machine running at higher power factor.

Machines employing superconducting wire for the windings allow for high fields (a high flux density in the airgap leading to high torques for a given machine) exceeding the conventional limits imposed by permanent magnet materials or 15 electromagnets (usually limited to 1-2T). Airgap flux densities of 4T are typical (with an air-cored system to avoid issues of steel magnetic saturation). A superconductor (which has very little resistance at low temperatures) allows high fields to be produced without significant losses (due to Joule heating effects). Developments in High Temperature Superconductor (HTS) wire have allowed the realization of a practical machine as the required temperatures (for example ~32K) are more readily achievable although maintaining these temperature requires cryogenic cooling loops within the machine and significant infrastructure (e.g. coolers) to support the cryogenics.

Although HTS is in its infancy, the technology has improved significantly and their performance is more stable making spontaneous quenches caused by thermal disturbances rare. However, transient fault conditions (which although infrequent and short lived) occur in electrical machines can lead to overcurrents and result in thermal runaway and quenching. The machine must be maintained at its cooled running temperature at all times due to the time taken to draw the system down to the correct temperature. Practical HTS superconducting machines are usually based on a synchronous machine topology with the HTS coil creating the DC excitation field and the AC stator winding still being conventional wire.

As the HTS coil system is rotating, the cryo-coolant must be supplied to a rotating system leading to complicated seal arrangements and practical difficulties associated with differential thermal expansions. Although active parts of the machine may be operating in a vacuum to reduce heat losses (through convection), the rotor coils are connected to the output shaft allowing for potential heat loss through conduction. The prevention of heat loss through shafts and the like is challenging given the requirements for the rotor to transmit the rated torque of the motor.

In light of the above problems, the applicants have developed an alternative approach to the industry pull and provide a high torque electrical machine which overcomes many of the disadvantages outlined above. From the terminals the machine operates as a conventional permanent magnet brushless motor, but has a magnetic gearing mechanically and magnetically integrated within the machine.

According to a first aspect of the present invention, there is provided a propulsion device for a marine vessel, the propulsion device comprising an electrical machine with integral magnetic gearing having a magnetic pole piece rotor connected to an output drive shaft for providing propulsion to the marine vessel.

Such an electrical machine with integral magnetic gearing converts a high speed rotation of one rotor (which is caused to rotate by currents in a stator winding) into a lower geared speed on a secondary rotor. In gearing down speed, the torque is geared up and therefore a combination of the primary excitation rotor and stator winding only needs to provide a low torque. The currents and hence losses in the machine element are then minimized (reducing the requirement for cooling). The integral magnetic gearing within the machine exploits a magnet-to-magnet coupling principle which is capable of providing very high airgap shear stress, and is capable of bearing the large output torques without requiring large active airgap area. The overall machine then has very high torque density leading to a compact machine for a given torque. The resulting machine for a given torque output will then be significantly smaller than a conventional direct drive machine, using a similar cooling regime to remove the losses in the windings. The resulting machine is capable of operating with a high power factor (0.8-0.95 being typical) allowing for a correctly rated power electronic converter to be employed.

Preferably, the electrical machine with magnetic gearing comprises three members, a first member of which comprises a first set of permanent magnets and forms a high speed, low torque rotor, a second member of which comprises a stator provided with a second set of permanent magnets, the two sets of permanent magnets having different numbers of magnetic poles; wherein the third member is the magnetic pole piece rotor and forms a low speed, high torque output rotor relative to the first member and a multi-phase winding is arranged to interact with the fundamental space harmonic of the magnetic field created by first set of permanent magnets of the first member.

In an alternative embodiment, the electrical machine with magnetic gearing preferably comprises three members, a first member of which comprises a first rotor with an electrical winding arrangement and forms a high speed, low torque rotor, a second member of which comprises a stator provided with a set of permanent magnets having a respective number of pole pairs; wherein the third member is the magnetic pole piece rotor and forms a low speed, high torque output rotor relative to the first member; and a multi-phase winding is arranged to interact magnetically with a fundamental space harmonic of a magnetic field created by the electric winding arrangement associated with the first member.

The electric winding arrangement on the high speed rotor is supplied via slip rings or preferably by a small permanent magnet alternator and a rotating rectifier arrangement similar to a conventional wound field synchronous machine. The internal gearing is derived from a non-contacting magnetic gear instead of an external gearbox and has the advantages of reduced wear, lubricant-free operation and reduced maintenance costs.

The electrical machine with integral magnetic gearing can be a radial field (with concentric rotors and stators and main airgap flux flowing in a radial direction with respect to the main shaft) or an axial field version (with face to face rotors and main airgap flux running parallel to the output shaft). In an axial arrangement, the input rotor and the output rotor are at least one of annular or disc shaped, and axially disposed along the axis of rotation thereby forming an axial field rotary electrical machine.

Also if necessary the gear torque transmission capability can be designed such that if a pre-determined torque is exceeded the gear will slip which can be used to protect the transmission system, for example if the propeller becomes ensnared or beaches. When the abnormal load torque is removed the magnetic gear automatically re-engages.

The magnetic gear element also introduces a degree of compliance into the drive train. As the torque increases a "load angle" appears between the input and output rotors. This load angle can be defined as the electrical angle between the magnetic field produced by the high speed rotor (inner rotor in main embodiment) and the harmonic of a magnetic field with the same pole number produced by the static magnet array due to the modulating pole pieces (as opposed to a definition based on the mechanical angle between the rotors as they are asynchronous). A torque against load angle characteristic is similar to the half sinusoidal load angle characteristic of a conventional synchronous machine (where load angle is defined as the angle between rotor and stator magnetic fields which do rotate synchronously).

Under normal operation the gear element operates on the stable region of this characteristic until the maximum torque capability of the gear coupling is exceeded at which point the rotors "pole-slip". The load angle between the two rotors in this stable region acts as a torsional spring or compliance, which in combination with the two rotor inertias acts as a low-pass filter and reduces/removes torque and speed oscillations which would otherwise be transmitted on the prop shaft drive train and reduces shaft-borne and hence waterborne noise. The coupling of the inner and outer rotor inertias via the torsional compliance of the magnetic gearing means that torque pulsations due to cogging torque (interaction between magnets and stator) and ripple torque (due to winding currents, pwm frequencies etc) are not present on the output shaft unlike in a direct drive electrical machine. Although the above features can be "designed out" of a conventional direct drive machine, due to manufacturing tolerances some torque pulsations/ripple is always present.

The losses in a magnetic gear (due to hysteresis and eddy current loss in the pole-pieces and eddy currents in the magnets) are relatively constant with a given speed (hysteresis and eddy loss being frequency dependant). By carefully segmenting the magnets and laminating pole pieces these losses can be minimized and the gear operates at high efficiency. The magnetic gear element also has significantly better efficiencies at part-load than a mechanical gearbox. As this magnetic gearing also enables the stator currents to be reduced for a given output torque, the overall motor and hence drive train efficiency will be higher than a direct drive permanent magnet machine, and significantly higher than a system employing a mechanical gear and high speed electrical machine. This reduces fuel consumption, running costs, and emissions and increases operational range between refuelling when a vessel spends a significant proportion of its time at lower load. Due to the high efficiency the cooling requirements for the machine (to remove the losses) are minimized, simplifying the overall system.

As the POD is significantly more compact than other direct drive motors, it can allow for a more compact pod for pod propulsion reducing hydrodynamic effects and so making the device more hydro-dynamically efficient.

For in-hull systems, a compact machine with a smaller diameter is advantageous as it allows the motor to be located nearer to the stern of the vessel while maintaining an appropriate shaft rake on the propeller. For larger machines with large diameter (and hence distance of the shaft above mounting floor) the requirement to maintain a certain rake is problematic as the motor has to be placed further towards the bow leading to longer shaft lines which takes up valuable space and can increase shaft noise/vulnerability.

A compact machine also has the advantage of allowing installation of an in-hull propulsion machine late in the ship building process and makes removal and replacement significantly easier.

As stated previously the resulting machine also operates with a high power factor (0.8-0.95) minimizing the reactive currents and inverter size and losses.

At least one embodiment of the invention will now be described, by way of example only, and with reference to the accompanying drawings in which.

Figure 1:
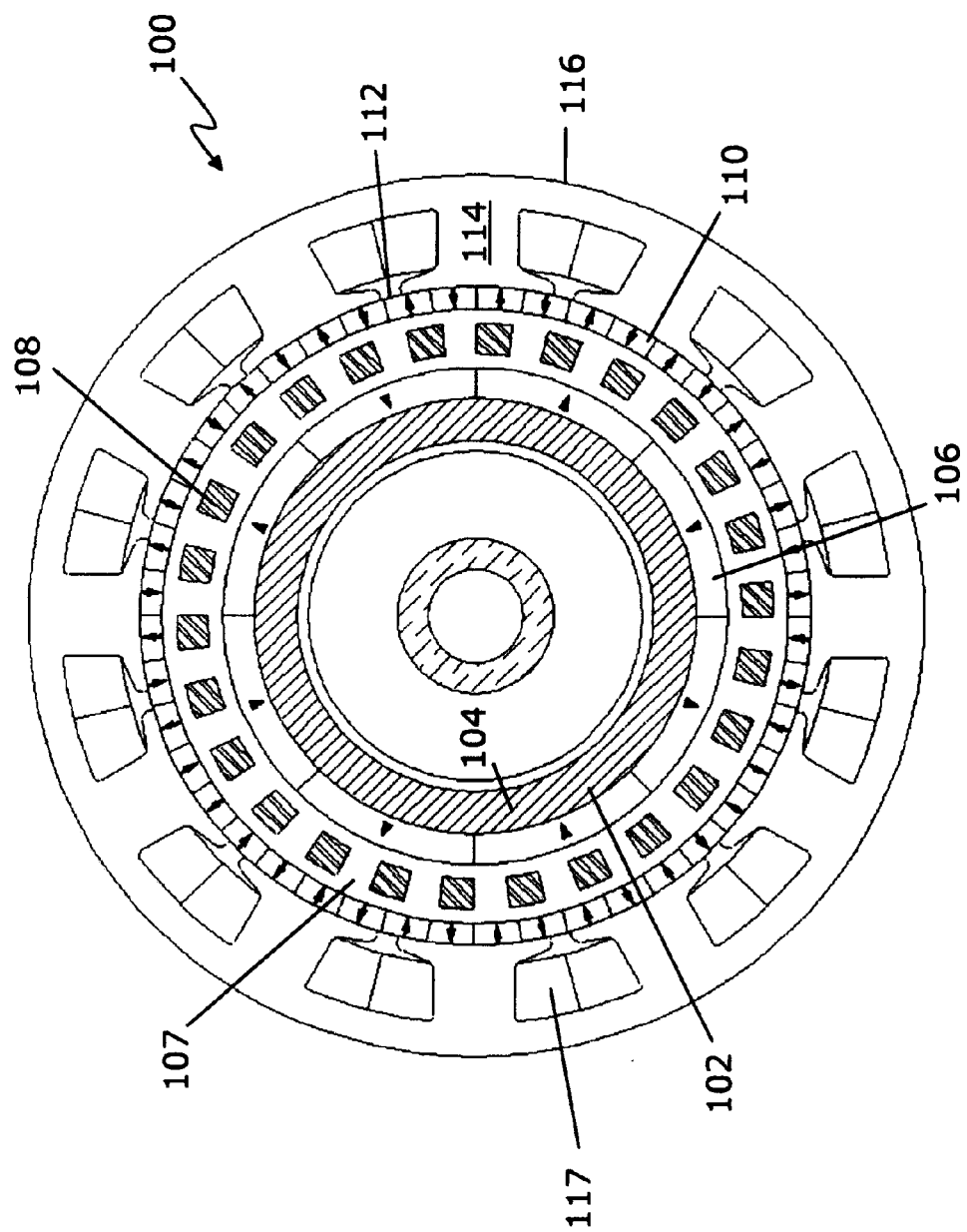
FIG. 1 is a schematic diagram of an electrical machine with integral magnetic gearing according to the prior art.

Thus referring to FIG. 1, a schematic diagram of an electrical machine 100 according to the prior art comprises a first or inner rotor 102 having a support 104 bearing a first plurality of permanent magnets 106. In the embodiment shown, permanent magnets having 8 poles are used. However, embodiments are not limited to using such a number of permanent magnets. Embodiments can be realized that use some other number of permanent magnets. The electrical machine 100 comprises a second rotor 107 in the form of a plurality of ferromagnetic pole pieces 108. The pole pieces 108 are arranged to magnetically couple the permanent magnets 106 of the first/inner rotor 102 to a plurality of second permanent magnets 110 that are fixed to a periphery of the wound stator in the region of the pole shoes 112 of respective teeth 114 thereby forming a wound stator 116. In the embodiment shown, a number of permanent magnets are fixed to the periphery of the wound stator 116. The embodiment comprises 12 teeth 114 with the respective periphery of the wound stator 116. It will be appreciated that embodiments are not limited to such a number of permanent magnets and teeth. Embodiments comprising some other number of permanent magnets and teeth can be realized.

The pole pieces 108 form a rotatable array of pole pieces 108. That is, they form the second rotor 107. The inner rotor 102 is rotatable. The teeth 114 and associated permanent magnets 110 are fixed. The coupling between the permanent magnets 106 and the permanent magnets 110 is realized using the rotatable pole pieces 108. Associated with the stator 116 is a plurality of 3-phase windings 117. The 3-phase windings, and associated currents, are arranged to create magnetic fields that couple with or form magnetic circuits with the first or fundamental harmonic of the permanent magnets 106 associated with the inner rotor 102. The inner rotor 102 rotates when a correct current sequence flows in the windings 117. Although the pole pieces 108 have no effect on the interaction between the windings 117 and the inner rotor 102, the presence of the pole pieces 108 produces an asynchronous harmonic with the same number of poles as the plurality of the static second permanent magnets 110. As the inner rotor 102 rotates, the second rotor 108 comprising the array of pole pieces 108 rotates at a geared speed because the second permanent magnets 110 are static.

The pole pieces 108 are usually connected to an end plate or end plates to transmit the torque to a central shaft. Although in the present case a plurality of 3-phase windings are associated with the stator 116, in general any multi-phase winding can be used such as a 5-phase winding. Additionally, a winding may comprise a number of independent coil circuits to enable redundancy or fault tolerance, known as duplex or triplex windings (in the event of one winding becoming open-circuit or short circuit the machine can still function).

The electrical machine described above comprises a permanent magnet excitation. Alternatively, the electrical machine with integral magnetic gearing can comprise a wound field excitation as disclosed in the applicant's co-pending GB patent application GB0807388.4, the contents of which are incorporated herein by reference in their entirety.

One skilled in the art understands how to select and design the pole pieces given the first 106 and second 110 permanent magnets, to achieve the necessary magnetic circuit or coupling such that gearing between the first 102 rotor and the pole piece rotor 108 as can be appreciated from, for example, K. Atallah, D. Howe, "A novel high-performance magnetic gear", IEEE Transactions on Magnetics, Vol. 37, No. 4, pp. 2844-2846, 2001 and K. Atallah, S. D. Calverley, D. Howe, "Design, analysis and realization of a high performance magnetic gear", IEE Proceedings—Electric Power Applications, Vol. 151, pp. 135-143, 2004, which are incorporated herein by reference in their entirety.

Figure 2:
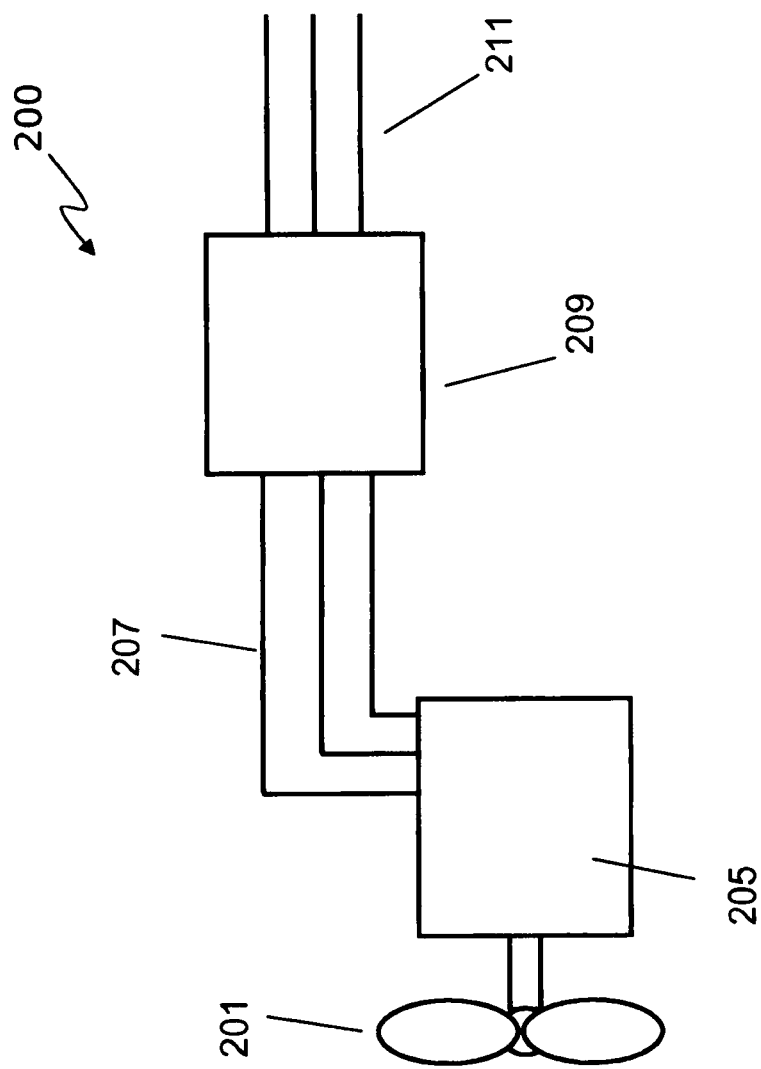
FIG. 2 is a block diagram of an electrical machine with integral magnetic gearing used as a propulsion device for a marine vessel according to a first embodiment of the present invention.

Referring to FIG. 2, a block diagram of an electrical machine with integral magnetic gearing used as a propulsion device for a marine vessel according to a first embodiment of the present invention comprises a propeller 201 connected to an electrical machine 205. The electrical machine 205 is an electrical machine 205 with integral magnetic gearing of a type discussed in respect of FIG. 1 above having a permanent magnet excitation arrangement although a wound field excitation can alternatively be used.

A power electronic converter 209 acting as an inverter is connected to the electrical machine 205 by way of a first power cable 207. A second power cable 211 is connected to the power electronic converter 209. A person skilled in the art is well aware that many options are available as a source for electrical power to connect to the second power cable 211. Second power cable 211 represents the ships main electrical buss (or grid) and is typically a fixed frequency AC or DC system, but can also be frequency wild AC. The primary electrical power source is typically a synchronous generator driven by a combustion engine fuelled with diesel or heavy fuel oil. Alternatively, other sources of mechanical input to these primary generators such as gas turbine engines, steam turbines (with, for example, heat to derive steam produced by a pressurized water nuclear reactor) or combined cycle turbines can be used. There may also be some intermediately energy store such as batteries or super capacitors. In the future power sources such as fuel cells may also become common place.

Figure 3:
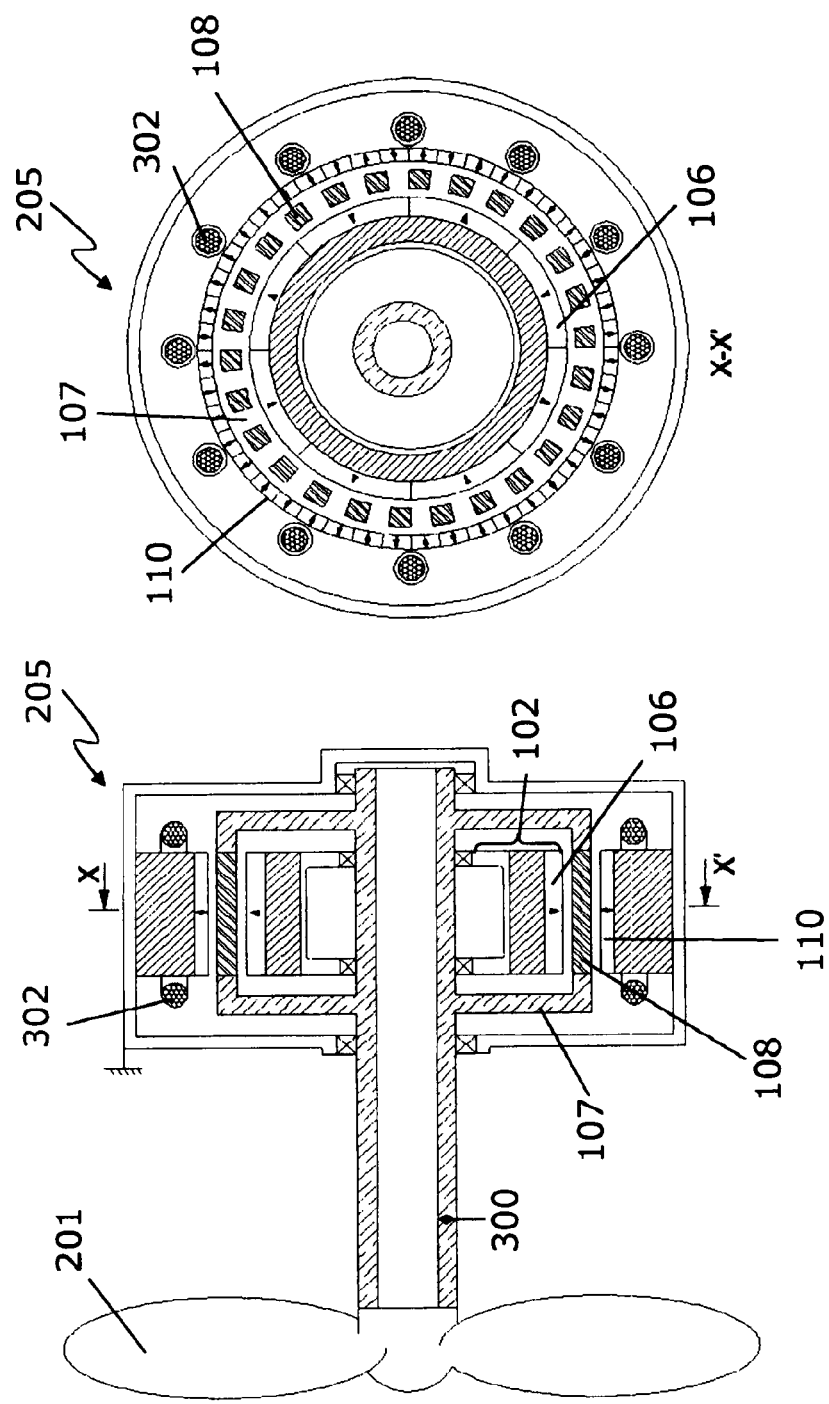
FIG. 3 is a cross-sectional view of an electrical machine with integral magnetic gearing used as a propulsion device for a marine vessel according to the first embodiment of the present invention.

FIG. 3 is a cross-sectional view of the electrical machine with integral magnetic gearing used as a propulsion device for a marine vessel according to the first embodiment of the present invention. In FIG. 3, like reference numerals to those used in FIG. 2 identify like parts.

In FIG. 3, a propeller 201 is connected to the electrical machine 205 by way of a drive shaft or propeller shaft 300. The drive shaft 300 terminates within the electrical machine 205 (although in certain embodiments the drive shaft 300 can project from the electrical machine 205 in order to accommodate additional functionalities such as sensors). The drive shaft 300 terminates within the electrical machine 205 because the drive shaft 300 is not also directly coupled to a further prime mover. Such an arrangement is preferred if the electrical machine is included in a so-called "all electric" propulsion system and the motor may be used in an "in-hull" arrangement or in a pod arrangement.

The electrical machine 205 comprises parts described above in respect of FIG. 1, where like reference numerals are used to identify like parts. The electrical machine 205 comprises a first or inner rotor 102 comprising a first plurality of permanent magnets 106. This rotor is free to rotate about the drive shaft 300 and is not necessarily connected to another output shaft. The electrical machine 100 comprises a second rotor 107 in the form of a plurality of ferromagnetic pole pieces 108 coupled to the drive shaft 300.

In order to support the pole-pieces 108 and transmit the torque of the pole-piece array to the drive shaft, the pole-pieces 108 are mounted on end plates or rings (not shown in FIG. 3) at one or both ends of the pole piece array. Mounting at both ends has a significant advantage of reducing the torsional deflections on the pole pieces due to the circumferential load torque and the magnetic pull of the permanent magnets. These end plates may be an integral part of the drive shaft but are more conveniently components that are splined or keyed onto the shaft to simplify assembly, i.e., to allow insertion of an internal high speed rotor. The pole pieces 108 and end plates can form a cage structure, but as the pole-pieces 108 are likely to be laminated/soft magnetic composite in order to impede eddy currents and reduce iron losses which impact on machine efficiency, additional mechanical support would normally be used. As outlined in the applicant's applications GB0808524.3, GB0800463.2, GB0902370.6, the contents of which are herein incorporated in their entirety by reference. The additional mechanical support can take the form of a non-magnetic, non-conducting structure between the pole-pieces, such as carbon fiber pultrusions and rods which may be under tension in order to preload the structure and reduce deflections.

The pole pieces 108 are arranged to magnetically couple the permanent magnets 106 of the first/inner rotor 102 to a plurality of second permanent magnets 110 that are fixed to a periphery of a stator 116. Associated with the stator 116 is a plurality of 3-phase windings 302 although a person skilled in the art has a choice of which multiphase windings to use.

Figure 4:
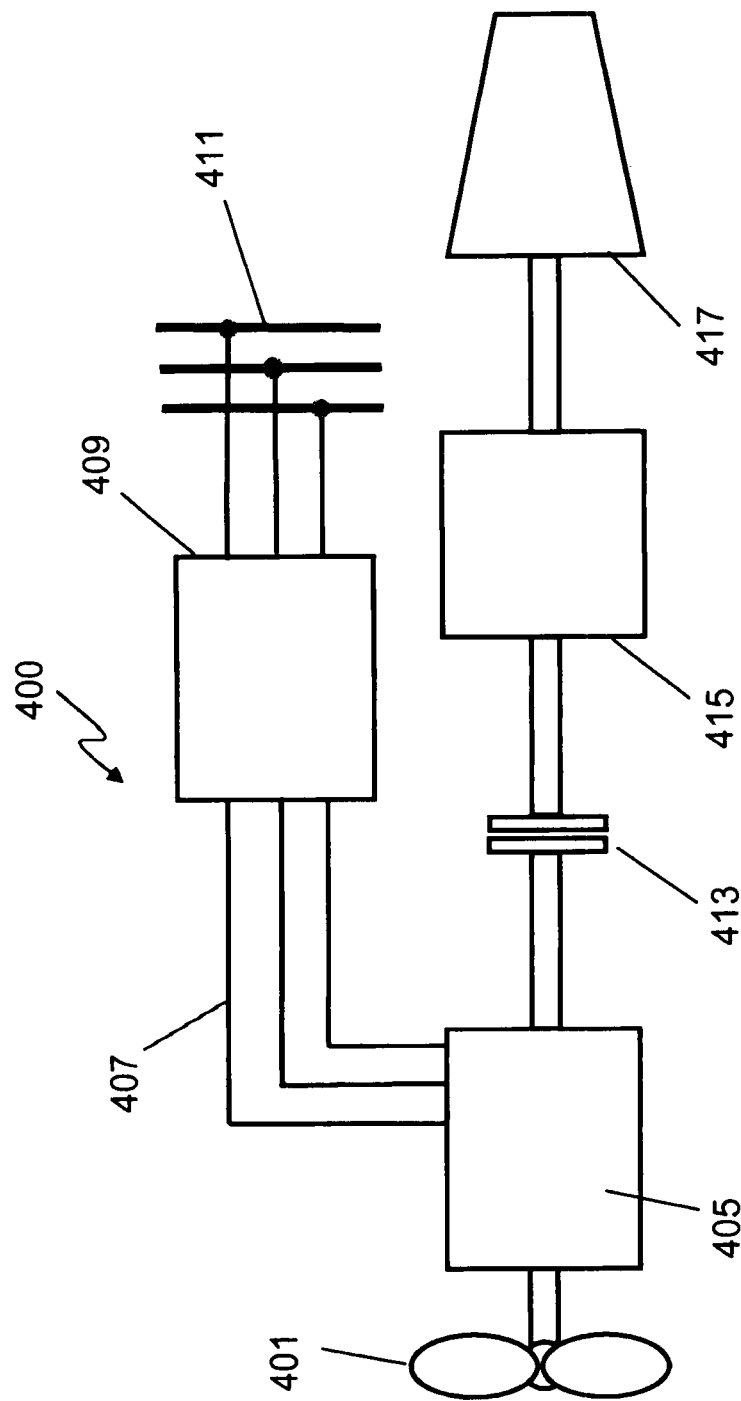
FIG. 4 is a block diagram of a hybrid propulsion device for a marine vessel according to a second embodiment of the present invention.

FIG. 4 is a block diagram of a hybrid propulsion device for a marine vessel according to a second embodiment of the present invention. Referring to FIG. 4, a propeller 401 is connected to an electrical machine 405. The electrical machine 405 is an electrical machine 405 with integral magnetic gearing of a type discussed in respect of FIG. 1 above having a permanent magnet excitation arrangement although a wound field excitation arrangement can alternatively be used.

A power electronic converter 409 acting as an inverter is connected to the electrical machine 405 by way of a power cable 407. The power electronic convertor 409 is connected to a main bus 411 of an electrical supply, which can be an AC or DC electrical supply. The electrical power transmitted on electrical bus 411 is derived from electrical generators connected to the propulsion engine 417 but is more likely derived from generators driven by additional prime-movers (gas turbines/diesel engines).

Also connected to the electrical machine 405 is a prime mover 417. The prime mover 417 is connected to the electrical machine 405 through a gearbox 415 and a clutch 413. In an alternative embodiment, the prime mover 417 can be directly connected to the electrical machine 405 without an intermediate connection to a gearbox 415 if the prime mover 417 comprises a lower speed engine.

FIG. 4 illustrates a hybrid system in which the propeller may be driven in a number of ways:

1. By the electrical machine alone (in which case clutch 413 will be disengaged so the machine does not have to drive the gear box and engine). This mode may be used for low speed manoeuvring or cruising, and for occasions when the engine cannot be run in order to reduce noise and emissions.

2. By the engine alone (with the machine windings not being energized) which might be the case for high speed cruising when the engine may run at highest possible efficiency. This power route removes the electrical transmission and conversion losses.

3. Both motor and engine engaged, with electrical motor acting to boost propeller power by adding to propulsion engine power. This would allow power derived from additional auxiliary prime-movers (which are used to generate the electrical power) to be transmitted to the propulsion power train.

4. The electrical machine can also act as a generator (the geared electrical machine is similar to other PM excited machines and has reciprocal behavior and can be either a generator or motor). This allows power to be taken off the shaft as electrical power. This allows the main propulsion engine to generate additional electrical power if required to supplement engine and generator sets dedicated to electrical power generation or if there is a fault on these systems.

Figure 5:
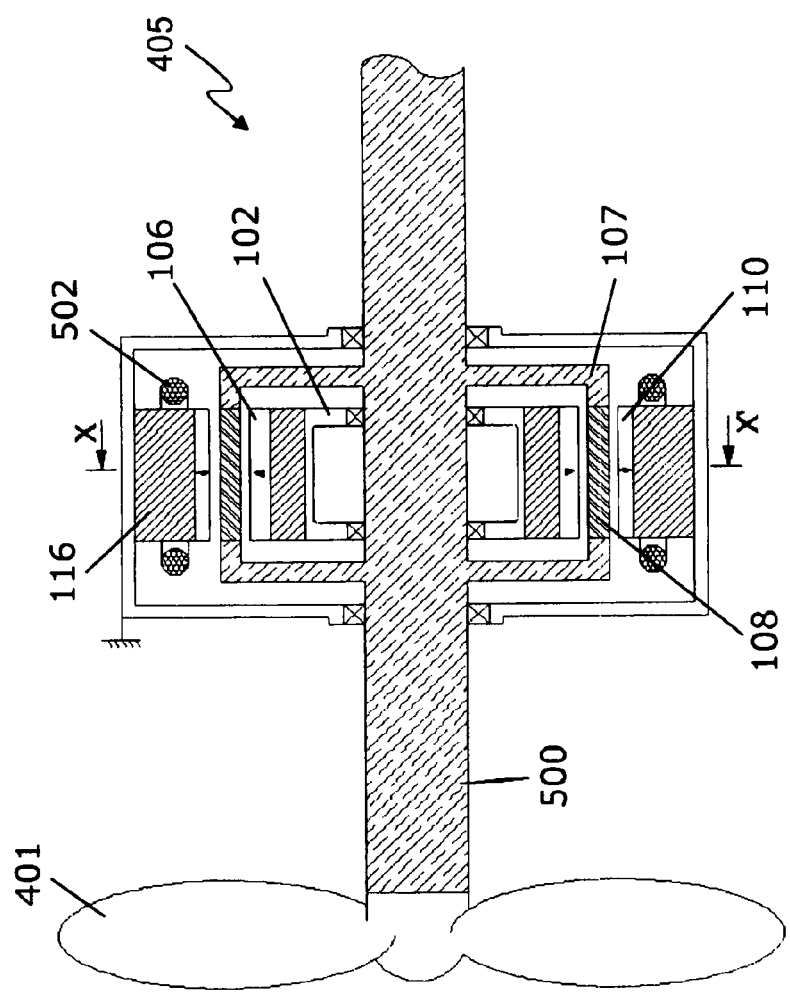
FIG. 5 is a cross-section through the electrical machine with integral magnetic gearing illustrated in FIG. 4.

FIG. 5 is a cross-sectional view of the electrical machine with integral magnetic gearing used as a propulsion device for a marine vessel according to the second embodiment of the present invention. In FIG. 5, like reference numerals to those used in FIG. 4 identify like parts.

Referring to FIG. 5, a propeller 401 is connected to an electrical machine 405 by way of a drive shaft 500. The electrical machine 405 comprises parts described above in respect of FIG. 1, where like reference numerals are used to identify like parts. The electrical machine 405 comprises a first or inner rotor 102 comprising a first plurality of permanent magnets 106. The electrical machine 405 comprises a second rotor 107 in the form of a plurality of ferromagnetic pole pieces 108 coupled to the drive or propeller shaft 500.

The pole pieces 108 are arranged to magnetically couple the permanent magnets 106 of the first/inner rotor 102 to a plurality of second permanent magnets 110 that are fixed to a periphery of a stator 116. Associated with the stator 116 is a plurality of 3-phase windings 502 (or other multi-phase arrangement).

The drive shaft 500 is connected to both an output rotor associated with the electrical machine and also selectively connected to a prime mover (not shown in FIG. 5) by way of a clutch and gearbox assembly (also not shown in FIG. 5).

Figure 6:
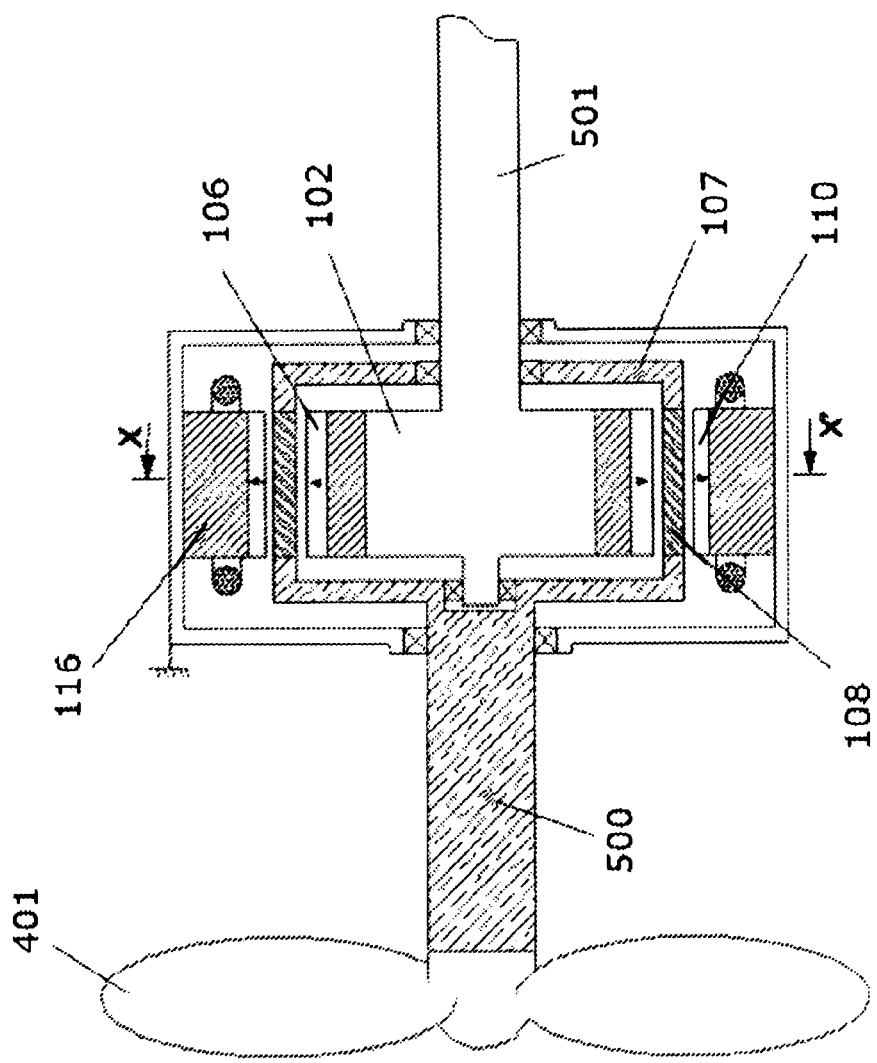
FIG. 6 is a cross-section through an alternative embodiment of a hybrid propulsion device for a marine vessel.

Referring to FIG. 6, a cross-section through an alternative embodiment of a hybrid propulsion device for a marine vessel illustrated in FIG. 4 comprises the mechanical drive from the main propulsion engine (417 in FIG. 4) mechanically connected to the high speed rotor 102 of the geared electrical machine. This may still be through a gearbox and clutch arrangement (415 and 413 in FIG. 4). In this arrangement the mechanical shaft is then split through the magnetic gear arrangement within the geared machine, i.e. there is a gear ratio between input shaft 501 and 500. This may then allow the removal of the gearbox (415 in FIG. 4) or the removal of one gear stage. This would have advantages as the magnetic gear is more efficient than the mechanical equivalent. It also introduces a torque fuse (due to the ability of the magnetic gear to pole slip) between the propeller and engine that was not present in the previous embodiment (FIG. 5).

In a non-electric mode where the engine provides all the propulsion power, the POD windings are not energized and the geared machine acts purely as a passive magnetic gear, gearing down the high speed input shaft 501 from the engine or engine/gearbox combination and increasing torque on the propeller shaft 500. Due to the torsional compliance of the gear the torque and speed pulsations from the engine are filtered out reducing shaft and water borne noise. In all electric mode a clutch arrangement (413 in FIG. 4) would be disengaged and the geared machine would operate as in previous embodiments albeit with some additional inertia now present on the high speed shaft due to the additional shaft components and moving elements in the clutch.

As with the previous hybrid embodiment both engine and geared machine may provide power to the output shaft in a peak power or boost mode or take power off the shaft with the geared electrical machine operating as a generator.

As discussed above, the electrical machine with integral magnetic gearing can be a radial field (with concentric rotors and stators and main airgap flux flowing in a radial direction with respect to the main shaft) or an axial field version (with face to face rotors and main airgap flux running parallel to the output shaft). In an axial arrangement, the input rotor and the output rotor are at least one of annular or disc shaped, and axially disposed along the axis of rotation thereby forming an axial field rotary electrical machine.

Figure 7:
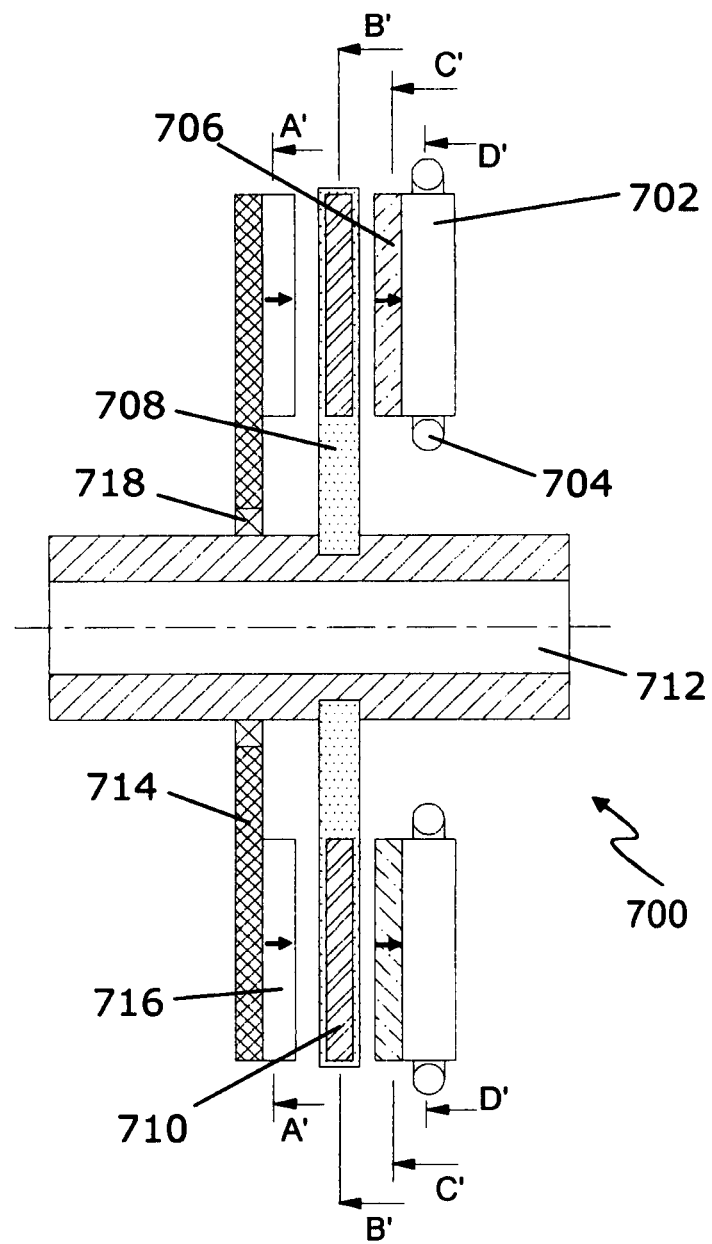
FIG. 7 is a cross-sectional view of an axial-field version of an electrical machine with integral magnetic gearing applicable to embodiments of the invention.

Thus, FIG. 7 is a schematic diagram of an axial field version of an electrical machine 700 having integral magnetic gearing. The electrical machine 700 comprises a stator 702 housing a multiphase winding 704 and, mounted on an inner surface of the stator 702, a static permanent magnet array 706. A low speed, high torque rotor 708 carrying an array of magnetic pole pieces 710 is adjacently facing the static permanent magnet array 706 and connected to an output or propeller shaft 712. A high speed, low torque rotor 714 carrying a permanent magnet array 716 facing the low speed, high torque rotor 708 is mounted on the propeller shaft 712 by a bearing system 718 such that in use the high speed, low torque rotor 714 can freely rotate about the propeller shaft 712.

Figure 8:
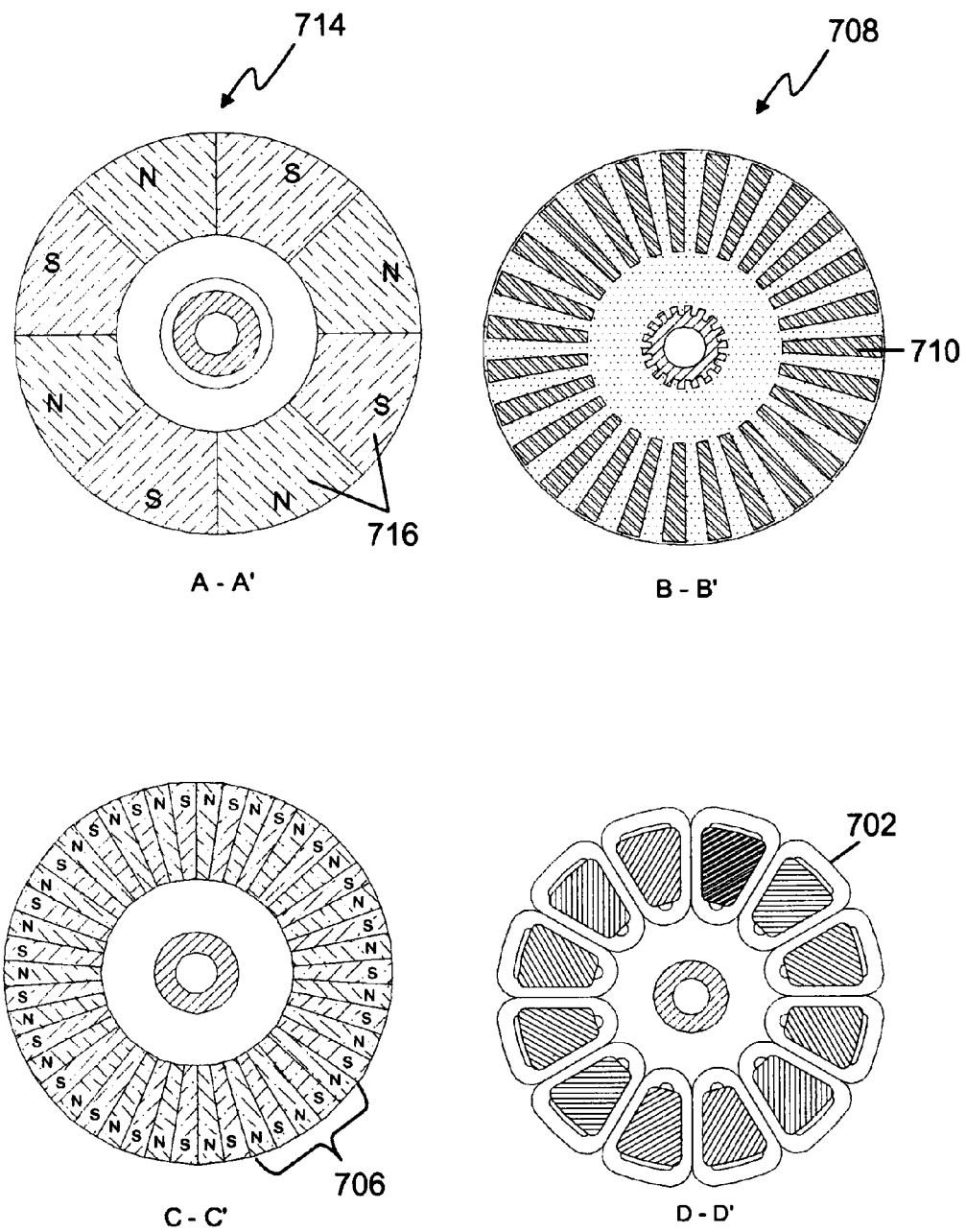
FIG. 8 is a number of sections through the axial-field version of the electrical machine with integral magnetic gearing illustrated in FIG. 7.

FIG. 8 is a number of sections through the electrical machine 700 at A-A', B-B', C-C' and D-D'. As best seen through cross-section A-A', the permanent magnet array 716 mounted on the high speed, low torque rotor 714 is formed of alternating magnetic poles. Cross-section B-B' illustrates the low speed, high torque rotor 708 carrying magnetic pole pieces 710 and cross-section C-C' illustrates the static permanent magnet array 706 mounted on the inner surface of the stator 702, which is shown in cross-section D-D'.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A propulsion device for a marine vessel, the propulsion device comprising:
an electrical machine with integral magnetic gearing comprising three members, a first member of which forms a first rotor with an associated magnetic field, a second member of which comprises a stator provided with a first set of permanent magnets and a third member of which forms a magnetic pole piece rotor, wherein a multi-phase winding is arranged to interact with a fundamental space harmonic of the magnetic field associated with the first member, and the magnetic pole piece rotor is connected to a drive shaft provided with a propulsion means for providing propulsion to the marine vessel; and
a prime mover connected to the electrical machine.

2. A propulsion device as claimed in claim 1, wherein the first member comprises a second set of permanent magnets and the multi-phase winding is arranged to interact with the fundamental space harmonic of the magnetic field created by the second set of permanent magnets.

3. A propulsion device as claimed in claim 1, wherein the first member comprises an electrical winding arrangement and the multi-phase winding is arranged to interact with a fundamental space harmonic of a magnetic field created by the electrical winding arrangement.

4. A propulsion device as claimed in claim 2, wherein the first rotor is, in use, a rotor driven by the multiphase winding and the magnetic pole piece rotor is, in use, a rotor for magnetically gearing down speed and increasing torque relative to the first rotor.

5. A propulsion device as claimed in claim 1, wherein the magnetic pole piece rotor is connected to a drive shaft that is connected to the prime mover and to the propulsion means.

6. A propulsion device as claimed in claim 5, comprising a gearbox assembly connected to the drive shaft and between the prime mover and the electrical machine.

7. A propulsion device as claimed in claim 1, comprising a clutch assembly connected to the drive shaft and connected between the electrical machine and the prime mover to, in use, selectively mechanically disengage the prime mover from the propulsion means.

8. A propulsion device as claimed in claim 1, wherein the first rotor is, in use, connected to a drive shaft that is connected to the prime mover and wherein the magnetic pole piece rotor is, in use, a rotor for magnetically gearing down speed and increasing torque relative to the rotation of the first rotor.

9. A propulsion device as claimed in claim 2, wherein the first rotor is mounted on the drive shaft.

10. A propulsion device as claimed in claim 9, wherein the first rotor is mounted on bearings on the drive shaft.

11. A propulsion device as claimed in claim 2, wherein the first rotor and the magnetic pole piece rotor are at least one of annular or disc shaped, and axially disposed along the axis of rotation thereby forming an axial field rotary electrical machine.

12. A propulsion device as claimed in claim 1, wherein the propulsion means is a propeller.

13. A marine vessel comprising a propulsion device as claimed in claim 1.

* * * * *